United States Patent [19]

Ranalli

[11] Patent Number: 5,610,746
[45] Date of Patent: Mar. 11, 1997

[54] PROGRAMMABLE SWITCHED DELAY ENCODER

[76] Inventor: Eliseo R. Ranalli, 211 Berkeley Ave., Irvine, Calif. 92715

[21] Appl. No.: 536,078

[22] Filed: Sep. 29, 1995

[51] Int. Cl.$^6$ .............................. H04J 14/08; H04B 10/00
[52] U.S. Cl. ........................ 359/140; 359/154; 359/173; 385/24; 250/227.12
[58] Field of Search ....................... 359/140, 136, 359/154, 173, 187; 385/24, 27; 250/227.12

[56] References Cited

U.S. PATENT DOCUMENTS

| | | | |
|---|---|---|---|
| 4,166,212 | 8/1978 | Judeinstein | 250/199 |
| 4,429,393 | 1/1984 | Giliano | 372/21 |
| 4,956,834 | 9/1990 | Coleman | 359/123 |
| 4,959,826 | 9/1990 | Smith | 319/187 |
| 5,099,347 | 3/1992 | Daniele et al. | 359/123 |
| 5,103,333 | 4/1992 | Koai | 359/140 |
| 5,111,322 | 5/1992 | Bergano et al. | 359/122 |
| 5,115,428 | 5/1992 | Ramanan et al. | 370/68 |
| 5,117,196 | 5/1992 | Epworth et al. | 359/333 |
| 5,140,651 | 8/1992 | Soref et al. | 385/2 |
| 5,185,833 | 2/1993 | Betts | 385/46 |
| 5,363,385 | 11/1994 | Heidemann | 372/6 |

OTHER PUBLICATIONS

"Coherent Optical CDMA Networks", Journal of Lightwave Technology, vol. II, No. 5/6, May/Jun. 1993, pp. 854–864.

*Primary Examiner*—Wellington Chin
*Assistant Examiner*—Kinfe-Michael Negash
*Attorney, Agent, or Firm*—Richard L. Myers

[57] ABSTRACT

A method of operating a programmable switched delay encoder as both a carrier signal generator and as an associated matched filter is disclosed. A user input specifies which carrier signal is to be generated by a transmitting programmable switched delay encoder and also specifies that the same selected carrier signal to be passed by the receiving programmable switched delay encoder. This user input renders the same feedback waveguides of the transmitting and receiving programmable autoregressive waveguide structures as transmissive, and also renders the same other feedback waveguides above the structures as absorbing, thus configuring both structures in the same way.

20 Claims, 3 Drawing Sheets

— 4 BASIS WAVEFORMS
--- 8 BASIS WAVEFORMS

Fig. 3

— 4 BASIS WAVEFORMS
--- 8 BASIS WAVEFORMS

Fig. 4

PROGRAMMABLE SWITCHED DELAY ENCODER

BACKGROUND OF THE INVENTION

1. Field of the Invention

The present invention relates generally to asynchronous, multiple-access optical communications and, more particularly, to a method of generation, and providing matched filtering for, wide-band optical carrier waveforms using code-configurable, active optical waveguiding structures.

2. Discussion of the Prior Art

The prior art has devoted considerable resources in efforts to develop communication schemes which are effective and economical. Generally speaking, optical fibers provide a communications channel with an extraordinarily large available bandwidth, which may, for example, be utilized for providing multiple access capabilities. Given such capabilities, many independent messages may be sent by many independent transmitting sources to many independent receivers along a common channel. Only two of the popular schemes proposed by the prior art to realize multiple access fiber optic communications are truly asynchronous, in the sense that data may be received by the appropriate receiver without having to synchronize (i.e. establish a time reference) with the transmitting source. These techniques are wavelength division multiplexing (WDM) and code division multiple access (CDMA).

In a WDM channel, an information carrier would be a spectrally pure (i.e. single-frequency) optical waveform. A given channel would then distinguish itself from others simply by virtue of having a different spectral center frequency than the others. Since an optical fiber is generally considered to be a linear optical waveguide, many such carrier waveforms may be superposed in a fiber without distortion, each communicating information independently of the other carriers. A receiver may then select a channel (i.e. be configured to receive only messages which are carried by a particular target frequency) simply by filtering out all wavelengths, except those in the vicinity of that frequency. Such communications are asynchronous because a receiver, tuned to an optical carrier which corresponds to the color red, for example, can receive information carried by red light without having to synchronize with the red transmitter. Thus, a given message, transmitted with an arbitrary delay by a red laser, will be received identically (except for the delay) by the red-pass filtered receiver, regardless of the delay. In contrast, synchronous schemes derive information about individual channel identity from the temporal arrangement of the received data, so that a delay (or any other uncertainty in the receiver time reference) can compromise the integrity of the channel identity.

The WDM technique can be considered an optical analog of the amplitude modulation technique, which is common in radio communications. Although WDM is simple in theory, its optical implementation can be quite challenging, particularly when a configurable (i.e. tunable) filter is desired. Despite a considerable amount of research focused on parametrically tuning the electronic resonances of optical materials to match a desired wavelength (e.g. via the electro-optic andquantum-confined Stark effects), most practical optical filtering schemes (e.g. in grating and etalon structures) achieve spectral selectivity via a tapped delay line approach, superposing many delayed copies of the received optical signal using an appropriate geometrical structure. In order to achieve an arbitrarily centered, narrow pass band, each delayed copy of the incoming light must be attenuated by an appropriate coefficient. A distributed Bragg reflector (DBR) mirror, commonly used for producing semiconductor lasers with very narrow spectral widths, is an example of this type of structure, with fixed coefficients. In attempting to extend this scheme to tunable filters, a severe practical difficulty is encountered in trying to accommodate many coefficients, which values must be variable over a continuous range. Considerable practical advantage would be gained if another type of optical carrier could be generated using strictly binary filter coefficients, signifying whether a particular delay is present or not.

Optical CDMA attempts to do this for strictly digital data using optical orthogonal codes. A CDMA carrier would be an incoherent optical waveform which is non-zero sparsely, during constant-duration (so-called chip) intervals. A matched filter for that carrier would simply consist of a delay line with equal gain taps, at delays specified by the optical orthogonal code for that chip sequence. If the matched filter receives the carrier signal for which it was designed, a large, instantaneous (correlation) peak results at the output, whose presence is ascertained via a threshold detector. If, instead, a different carrier is present, for which the filter is not matched, there will be no large peak. Such are the properties of optical orthogonal codes. Thus, communication of digital data via optical CDMA channels amounts to asynchronously observing the stream of above-threshold peak photodetector impulses at the optical filter output.

As with WDM, optical CDMA is a technique borrowed from radio communications, whose optical implementation leads to severe practical constraints. The most important limitation is that since the waveforms must be (temporally) incoherent, they cannot be encoded via a tapped delay line structure (although they may be decoded that way); they must instead be encoded by direct chip-sequence modulation of an incoherent source. However, since this chip sequence is presumably at a much higher rate than the data, this limits the data rate to be substantially lower than that for which optical modulators are capable.

A need has thus existed in the prior art for a simple, efficient, easily configurable, multiple-access optical communications scheme which allows data rates to be limited only by the speed of optical modulators.

SUMMARY OF THE INVENTION

The deficiencies of the prior art are overcome with the method of the present invention, which implements a method of operating a programmable switched delay encoder as both a transmitting programmable switched delay encoder (carrier signal generator) and as a receiving programmable switched delay encoder (the associated matched filter). A user input specifies which carrier signal of a plurality of carrier signals is to be generated by the transmitting programmable switched delay encoder and also specifies that the same selected carrier signal is to be passed by the receiving programmable switched delay encoder.

This user input renders the same feedback waveguides of the transmitting and receiving programmable switched delay encoders as transmissive, and also renders the other feedback waveguides of both of the structures as absorbing, thus configuring both structures in the same way.

A wide band optical source is then input into the transmitting programmable switched delay encoder, where a predetermined amplification and the selected feedback waveguides generate an output. The output is then received into the similarly configured receiving programmable switched delay encoder, where the same gain and feedback waveguides are applied. A square-law detector is used to generate an electrical signal, which is proportional to the average intensity of the output from the receiving programmable switched delay encoder.

The wide band optical source, which is input into the transmitting programmable switched delay encoder, applies at least one delay to the wide band optical source after the wide band optical source is amplified by the predetermined amplification. The at least one delay, which is applied according to the user input, corresponds to the selected feedback waveguide. Thus, a user may select a single feedback waveguide to generate a single delay, or select a plurality of feedback waveguides to generate a corresponding plurality of delays. After the wide band optical source is amplified and filtered according to the delays selected by the user, the transmitting programmable switched delay encoder outputs this signal as a carrier signal.

Each carrier signal output by the transmitting programmable switched delay encoder corresponds to a unique combination of the selected feedback waveguides, and the user can select each of a plurality of unique combinations of the selected feedback waveguides by inputting a binary word, for example.

The output from the transmitting programmable switched delay encoder is modulated to encode the information that is to be transmitted.

Upon passage of the modulated signal through the similarly configured receiving programmable switched delay encoder, according to one aspect of the invention, the output of the receiving programmable switched delay encoder is passed through a transducer to thereby generate sound waves which are detectible by a user. This aspect of the invention is particularly applicable when the present invention is used to provide telephonic communications.

According to another aspect of the present invention, the signal output from the receiving programmable switched delay encoder can be detected by first determining whether that output is greater than a predetermined threshold value. If the output from the receiving programmable switched delay encoder is greater that the predetermined threshold value, the output signal can be demodulated to thereby extract the information that was originally modulated and sent by the transmitting programmable switched delay encoder.

According to another aspect of the present invention, the wide band optical source may be generated from an incoherent light emitted from a light emitting diode. This incoherent light can have a broad distribution of frequencies over the frequency spectrum.

According to another aspect of the present invention, the transfer function of the transmitting programmable switched delay encoder, when programmed by the user input, is the same as the transfer function of the receiving programmable switched delay encoder. Additionally, the gain of the transmitting programmable switched delay encoder is set so that the average intensity of the carrier signal output therefrom is substantially the same as the average intensity of any other selectable carrier signal, which may be output by the transmitting programmable switched delay encoder. Thus, the user input signal selects from a plurality of carrier signals, but each signal will have the same average intensity. The transmitting programmable switched delay encoder and the receiving programmable switched delay encoder realize first and second active infinite impulse response (IIR) optical filters.

In a further aspect of the present invention, a single programmable switched delay encoder may be configured to serve as either a transmitting programmable switched delay encoder or a receiving programmable switched delay encoder. The single programmable switched delay encoder may thus operate as either a carrier signal generator or as an associated matched filter for receiving the carrier signal.

The number of feedback waveguides of the programmable switched delay encoder determines the number of carrier signals which may be generated therefrom. For example, if the programmable switched delay encoder has M feedback waveguides, each of which may be rendered transmissive or absorbing according to the user input, then $2^M$ distinct carrier signals may be generated by the same programmable switched delay encoder.

The apparatus of the present invention includes a transmitting station having a wide band optic source and a first switched delay encoder. The first switched delay encoder inputs the light, applies a gain to the inputted light, and applies a combination of feedback waveguides to the amplified light. The output from the first switched delay encoder is modulated with information to be communicated. The receiving station includes a second switched delay encoder, which is substantially similar to the first switched delay encoder, and which inputs the modulated signal and outputs a filter carrier output. A square law detector for generating an electrical signal which is proportional to an average intensity of the filtered carrier output is applied to the output of the second switched delay encoder, and the output from the square law detector can then be measured using a voltmeter, for example.

The invention together with additional features and advantages thereof may best be understood by reference to the following description taken in connection with the accompanying illustrative drawings.

DETAILED DESCRIPTION OF THE PRESENTLY PREFERRED EMBODIMENTS

Figure 1:
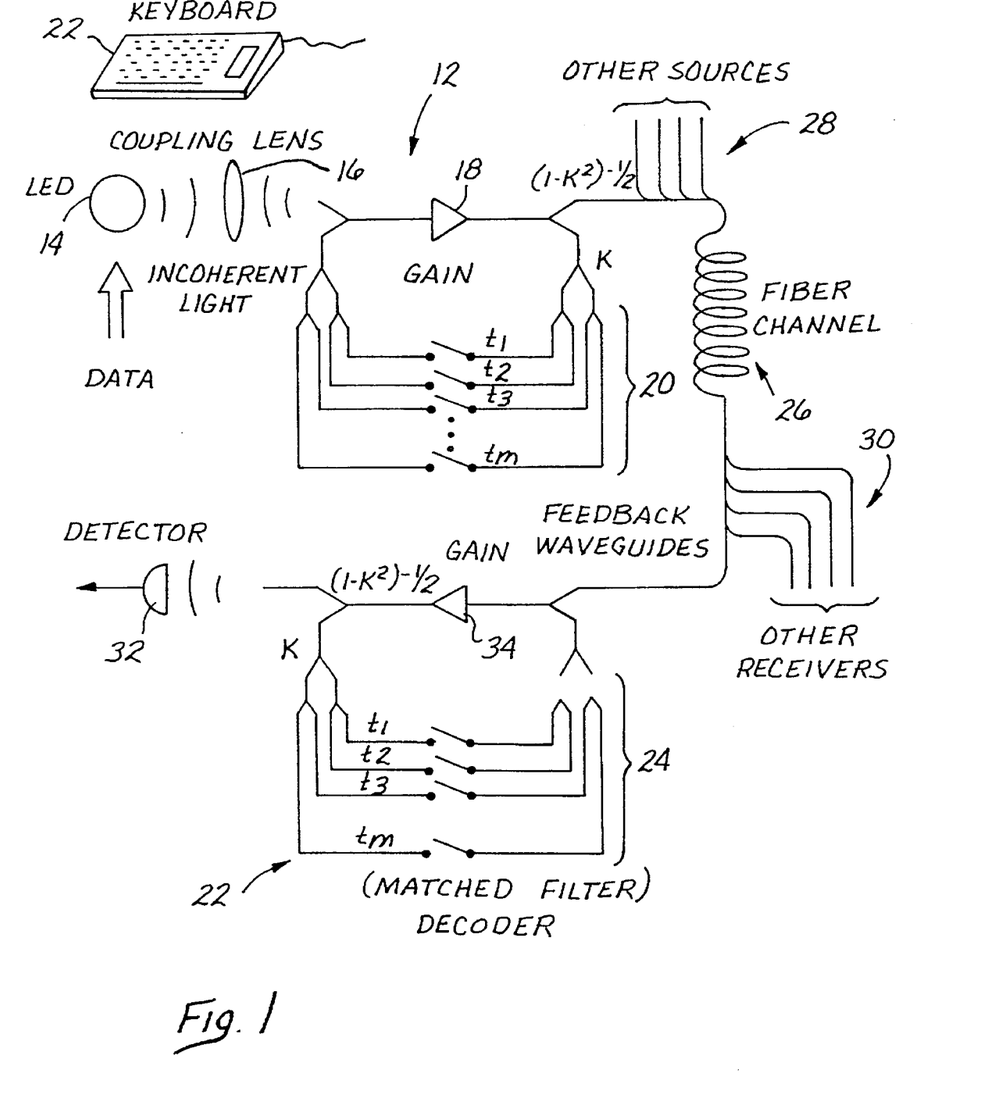
FIG. 1 is a schematic diagram illustrating the programmable switched delay encoder of the presently preferred embodiment.

Turning to FIG. 1, an optical communications system incorporating the Switched delay encoders of the presently preferred embodiment is disclosed. The encoder 12 comprises a transmitting switched delay encoder. The input to the transmitting switched delay encoder 12 is a wide band optical source, which preferably comprises a light emitting diode (LED) 14. The light emitting diode 14 emits a stationary, incoherent light, which is then focused by the coupling lens 16 into the transmitting switched delay encoder 12. The incoherent light from the LED 14 is analogous to white noise, since the light from the LED 14 comprises a wide band of frequencies.

The transmitting switched delay encoder 12 inputs the focused incoherent light and passes the focused incoherent light through a gain element 18. This gain element 18 merely amplifies the input signal. The output from the gain element 18 is then selectively passed through one or more of the plurality of feedback waveguides 20.

Each of the plurality of feedback waveguides 20 may be rendered transmissive or absorbing, according to a user input via the keyboard 22. The output of the transmitting switched delay encoder 12 is a quasi-orthogonal wave form, resulting from the gain element 18 and the plurality of transmitting feedback waveguides 20 which are rendered transmissive. The transmitting switched delay encoder 12 is similar to a generalization of a Fabry-Perot etalon with gain. Fabry-Perot resonators generate relatively simple transmission spectra. The transmitting switched delay encoder 12 of the present invention, however, incorporates the plurality of feedback waveguides 20 to generate a transmission spectrum which is much more detailed than that of the Fabry-Perot resonator.

In addition to being advantageous over the Fabry-Perot resonator, this detailed transmission spectrum is also advantageous over the wavelength division multiplexing (WDM) prior art method. Whereas a transmission spectrum of the wavelength division multiplexing system yields a single peak, a number of peaks are generated by the transmitting switched delay encoder 12 of the present invention. Consequently, difficulty in discriminating transmission spectra due to overlap is reduced by the transmitting switched delay encoder 12 of the present invention.

The likelihood of two transmission spectra of the present invention overlapping significantly is much less than the likelihood of two transmission spectra of a wavelength division multiplexing system overlapping significantly. For example, if the two peaks in two transmission spectra of the wavelength division multiplexing system are near one another, significant overlap may occur such that the peak of one transmission spectra may be mistaken for that of the other. In contrast, the transmission techniques of the present invention introduce a number of peaks in each transmission spectra, such that overlap of one peak, for example, does not significantly affect the discriminability of that carrier signal. For non-synchronous communications, the waveforms of the present invention exhibit much greater discriminability than wavelength division multiplexing system counterparts.

Figure 4:
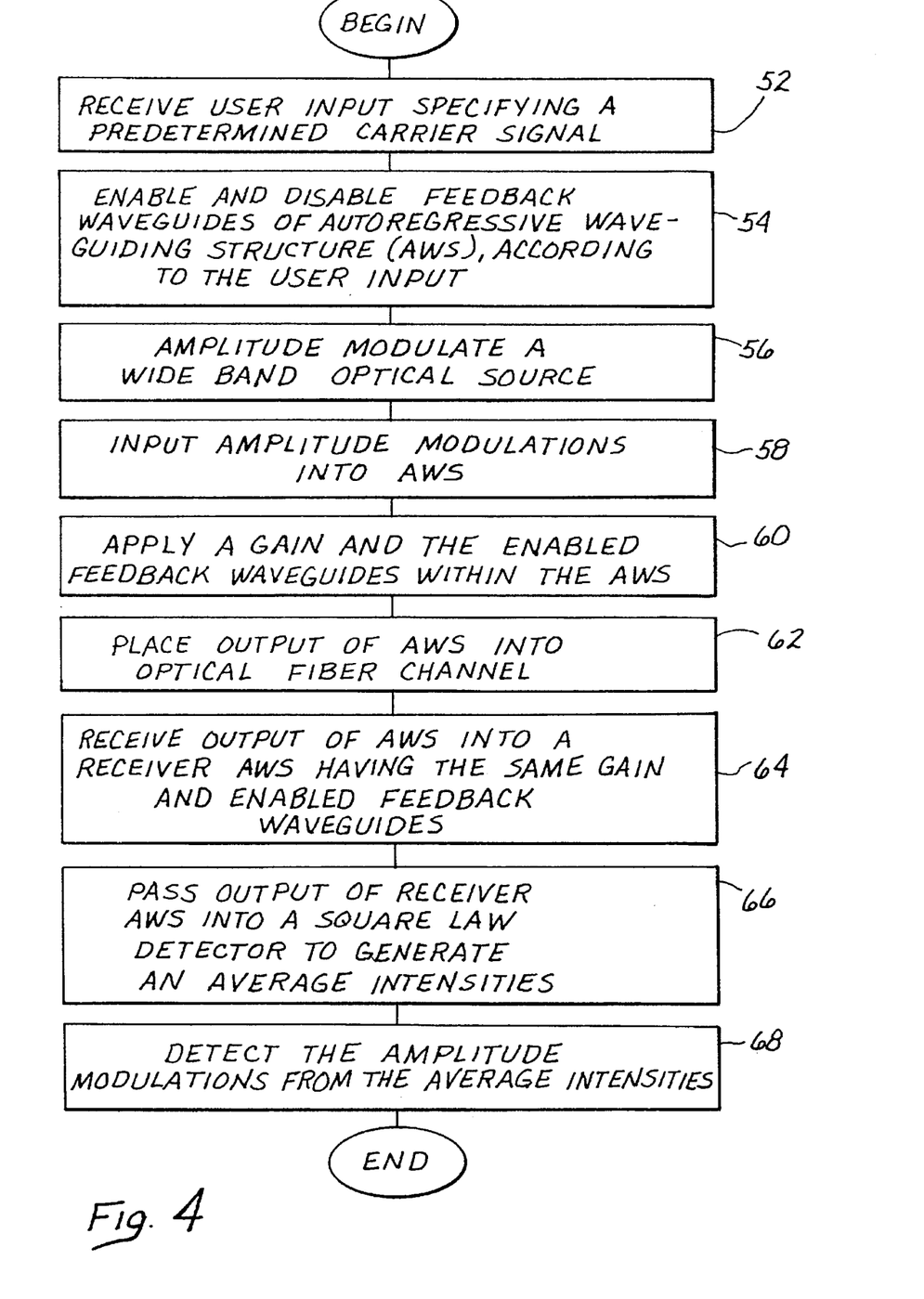
FIG. 4 is a flow chart depicting the method of communicating optical information using a pair of switched delay encoders.

Continuing with the description of the optical communications system shown in FIG. 4, the output from the transmitting switched delay encoder 12 is basically several delayed versions of an amplified incoherent light. This output could be analogized to speaking words into a canyon, receiving the echo, and then feeding everything back into the canyon, for a plurality of times. The number of times that the signal is fed back into the canyon corresponds to the selected number of feedback waveguides in the present invention. The resulting transmission spectrum generated from the transmitting switched delay encoder of the present invention is somewhat complicated, but none the less well definable.

The utility of using this resulting transmission spectrum as a carrier signal derives first from the good discriminability, and further derives from the simplicity and configurability of the transmitting switched delay encoder 12. That is, the receiving switched delay encoder 22 can easily be configured to Match that of the transmitting switched delay encoder 12 by simply rendering the plurality of feedback waveguides 24 to be either transmitting or absorbing.

The output from the switched delay encoder 12 is fed through the fiber channel 26 to the receiving switched delay encoder 22. The fiber channel 26 may be shared by many possible sources 28. Also, the fiber channel 26 may be split and routed to many possible receivers 30.

The receiving switched delay encoder 22 receives the output from the transmitting switched delay encoder 12 in combination with noise and signals from the other sources 28. Since the feedback waveguides 24 are configured the same as the feedback waveguides 20 of the transmitting autoregressive waveguiding structure 12, according to the user input via the keyboard 22, a signal the same as that input into the transmitting switched delay encoder 12 is output from the receiving switched delay encoder 22. In effect, the receiving switched delay encoder 22 is matched to filter (block) all light on the fiber channel 26, except for that light originally input into the transmitting waveguiding structure 12.

The detector 32 preferably comprises a square law detector, which generates an electrical signal that is proportional to an average intensity of the signal outputted from the receiving switched delay encoder 22.

The carrier waveforms generated by the transmitting switched delay encoder 12, according to the input via keyboard 22, are wide in band width because the transmitting switched delay encoder 12 does not limit the band width. Instead, the transmitting switched delay encoder 12 changes the frequency spectrum of the input incoherent light in a definable way. Each output from the transmitting switched delay encoder 12 is a stationary, autoregressive optical process having a power spectrum, which is uniquely defined by each of the feedback waveguides 20 that is set to be transmissive by the user input.

The receiving switched delay encoder 22 can easily pick up the transmitted carrier signal by simply setting the same feedback waveguides 24 to be transmissive. The gain 34 of the receiving switched delay encoder 22 is preferably set to be the same as the gain 18 of the transmitting switched delay encoder.

In the presently preferred embodiment, a number of code words define a corresponding number of carrier signals that can be generated by the transmitting switched delay encoder 12 (by setting the feedback waveguides 22 to be either transmissive or absorbing). Thus, the present invention realizes code addressable filters with nonoverlapping transmission spectra. Where the number of feedback waveguides 20 is M, with each of the M feedback waveguides 20 realizing a unique delay, $2^M$ distinct carrier waveforms may be generated, thus realizing $2^M$ simultaneous communication channels (carriers) on the single fiber channel 26.

Below, a series of equations and specifications are set forth, with reference to FIG. 2 and FIG. 3 and then the general method of the present invention is described with reference to FIG. 4.

If the number of feedback waveguides 20 is M, then an M bit binary word is used to identify which one of the carrier waveforms is to be output from the transmitting switched delay encoder 12. Assuming a delay time $t_m$ of the m'th feedback path (m=1, 2, ... M) is assigned as follows:

$$t_m = [2(m-1) + C_m]T_c \qquad \text{Equation 1}$$

As used in equation 1, $C_m$ is the m'th bit-in the M-bit binary word used to identify the carrier waveform generated by the transmitting switched delay encoder 12, and the variable $T_c$ is the chip interval. A constant gain is presumed to exist over the wavelength range of interest. The variable K (FIG. 1) is the output feedback coupling constant. The (power) transmission spectrum for the transmitting switched delay encoder 12 is then given by $$|H(f)|^2 = \frac{(1 - |K|^2)G_o^2}{\Delta} \quad \text{Equation 2a}$$

$$\Delta = \left( \cos(2\pi f t_D) - \frac{KG_o}{\sqrt{M}} \sum_{m=1}^{M} \cos(2\pi f t_m) \right)^2 + \left( \sin(2\pi f t_D) + \frac{KG_o}{\sqrt{M}} \sum_{m=1}^{M} \sin(2\pi f t_m) \right)^2 \quad \text{Equation 2b}$$

In these two equations, $t_D$ is the transit time through the gain section $G_o^2$ is the single-pass power gain for the active medium, and f is the low-pass frequency associated with the optical component at frequency $v=c/\lambda+f, \lambda$ being the free-space wavelength about which the optical source is expected to be centered, and c being the speed of light.

Assuming that a wide-band optical source for emitting incoherent light, such as the LED 14 of FIG. 1, has a power spectrum S(f) is input to the transmitting switched delay encoder 12, and assuming further that the transmitting switched delay encoder 12 has a transmission spectrum $|H_j(f)|^2$ associated with the binary word "j." The binary word "j" is assumed to be one of the "M" binary words used to designate the different carrier waveforms that can be output from the transmitting switched delay encoder 12. Assuming $G_o$ is chosen so that Equation 2a possess no poles over the band width covered by S(f), then the output from the transmitting switched delay encoder 12 is a carrier waveform with a power spectrum $S(f)|H_j(f)|^2$.

After this carrier waveform, corresponding to the user input of a binary word "j" is passed through the fiber optic channel 26, the carrier waveform is input into the receiving switched delay encoder 22. The receiving switched delay encoder 22 has a transmittance of $|H_k(f)|^2$ and has the same configuration as the transmitting switched delay encoder 12. The receiving switched delay encoder 22 acts as a receiving filter. The output intensity from the receiving switched delay encoder 22 will be a random variable whose mean, denoted by <k|S|j>, is $$<k|S|j> = \int_{-\infty}^{\infty} S(f)|H_j(f)|^2|H_k(f)|^2 df \quad \text{Equation 3}$$

A configuration of the switched delay encoders 12 and 22 with two feedback waveguides yields four independent basis carrier waveforms, and a configuration of three feedback waveguides yields eight independent basis carrier waveforms. In order to determine the average intensities detected by the detector 32, for all possible combinations of the configuration of the transmitting switched delay encoder 12 ("j") and the configuration of the receiving switched delay encoder 22 ("k"), to thereby determine carrier signal detection error probabilities, the following assumptions are made. The LED 14 is modeled as a Gaussian distribution in frequency, with a standard deviation equal to $1/(2T_c)$; the variable K is fixed at 0,9; the variable $t_D$ is chosen as $30T_c$; the variable $G_o$ is chosen for each of the switched delay encoders individually so that the <j|S|j>'s are equal to 100 times the total input power (to within 0.5%) for all "j". Typically, $G_o$ lies somewhere between 3 and 5. Numerical values can be obtained for the correlation coefficients, $Y_{j,k}$, defined as $$\gamma_{j,k} = \frac{<k|S|j>}{<j|S|j>} \quad \text{Equation 4}$$

These values are compiled in Tables I and II, reproduced below.

TABLE I

| CORRELATION COEFFICIENTS $\gamma_{j,k}$ FOR ETALONS WITH 2 FEEDBACK PATHS | | | | |
|---|---|---|---|---|
| "j":00 | 01 | 10 | 11 |
| "k":00 | 1.0000 | 0.0268 | 0.0134 | 0.0899 |
| 01 | 0.0268 | 1.0000 | 0.0462 | 0.0279 |
| 10 | 0.0134 | 0.0462 | 1.0000 | 0.0122 |
| 11 | 0.0899 | 0.0279 | 0.0122 | 1.0000 |

TABLE II

| CORRELATION COEFFICIENTS $\gamma_{j,k}$ FOR ETALONS WITH 3 FEEDBACK PATHS | | | | | | | | |
|---|---|---|---|---|---|---|---|---|
| | "j":000 | 001 | 010 | 011 | 100 | 101 | 110 | 111 |
| "k":000 | 1.0000 | 0.0294 | 0.0190 | 0.0245 | 0.0342 | 0.0277 | 0.0338 | 0.1087 |
| 001 | 0.0294 | 1.0000 | 0.0114 | 0.0307 | 0.0135 | 0.0189 | 0.0073 | 0.0236 |
| 010 | 0.0190 | 0.0114 | 1.0000 | 0.0191 | 0.0084 | 0.0519 | 0.0088 | 0.0196 |
| 011 | 0.0245 | 0.0307 | 0.0191 | 1.0000 | 0.0085 | 0.0119 | 0.0110 | 0.0250 |
| 100 | 0.0342 | 0.0135 | 0.0084 | 0.0085 | 1.0000 | 0.0097 | 0.0140 | 0.0403 |
| 101 | 0.0277 | 0.0189 | 0.0519 | 0.0119 | 0.0097 | 1.0000 | 0.0071 | 0.0128 |
| 110 | 0.0338 | 0.0073 | 0.0088 | 0.0110 | 0.0140 | 0.0071 | 1.0000 | 0.0170 |
| 111 | 0.1087 | 0.0236 | 0.0196 | 0.0250 | 0.0403 | 0.0128 | 0.0170 | 1.000 |

As can be expected, the above tables show that when the configuration of the transmitting switched delay encoder 12 ("j") is the same as the configuration as the receiving switched delay encoder 22 ("k"), then the carrier waveform transmitted by the transmitting switched delay encoder 12 is completely received by the receiving switched delay encoder 22. Assuming all carrier signal waveforms ar equally likely, a maximum a posteriori (MAP) detection scheme can be implemented by simply choosing the largest detector output. Detection can be modeled as a Poisson counting process having a mean that is proportional to the observation (integration) time. If carrier "j" is present at the input of the receiving switched delay encoder 22("k"), then the detector count $K_k$ will be a Poisson random variable with mean $\gamma_{j,k}K_s$, where $K_s$ is the average matched carrier signal count. From these assumptions, upper-bound error probabilities are computed based on the union bound approximation:

$$\text{Prob\{Detection error\}} \leq 1 - \frac{1}{M} \sum_{\substack{j=1 \\ j \neq k}}^{M} \text{Prob} \left\{ K_j \geq K_k \text{ assuming "j" was sent} \right\} \quad \text{Equation 5}$$

Figure 2:
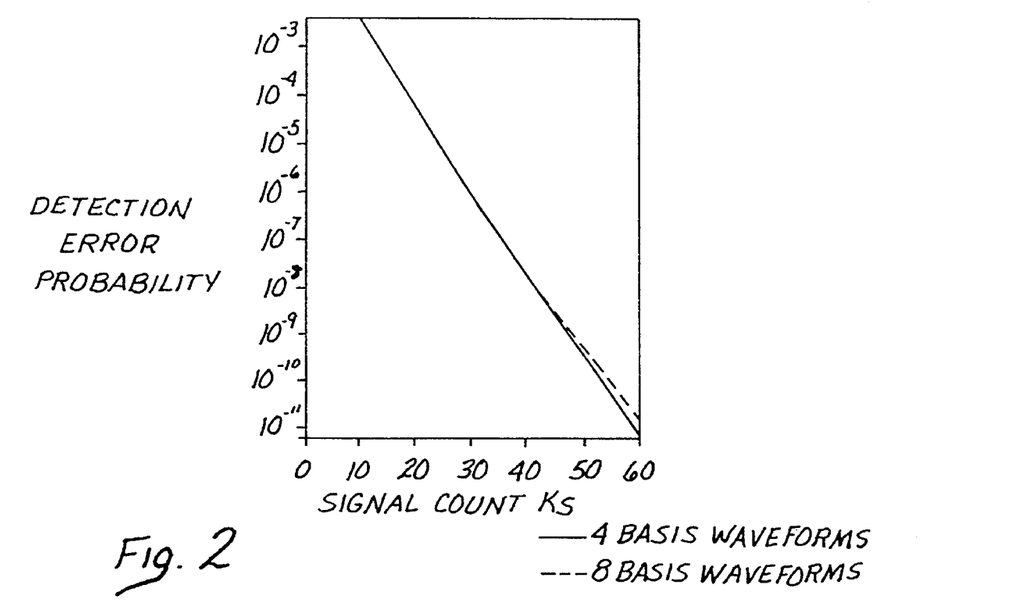
FIG. 2 is a plot of signal count versus detection error probability, according to the present invention.

FIG. 2 plots these results. It is clear that, for error probabilities below $10^{-9}$, there is virtually no difference in performance between 4-carrier waveform case and the 8-carrier waveform case.

Figure 3:
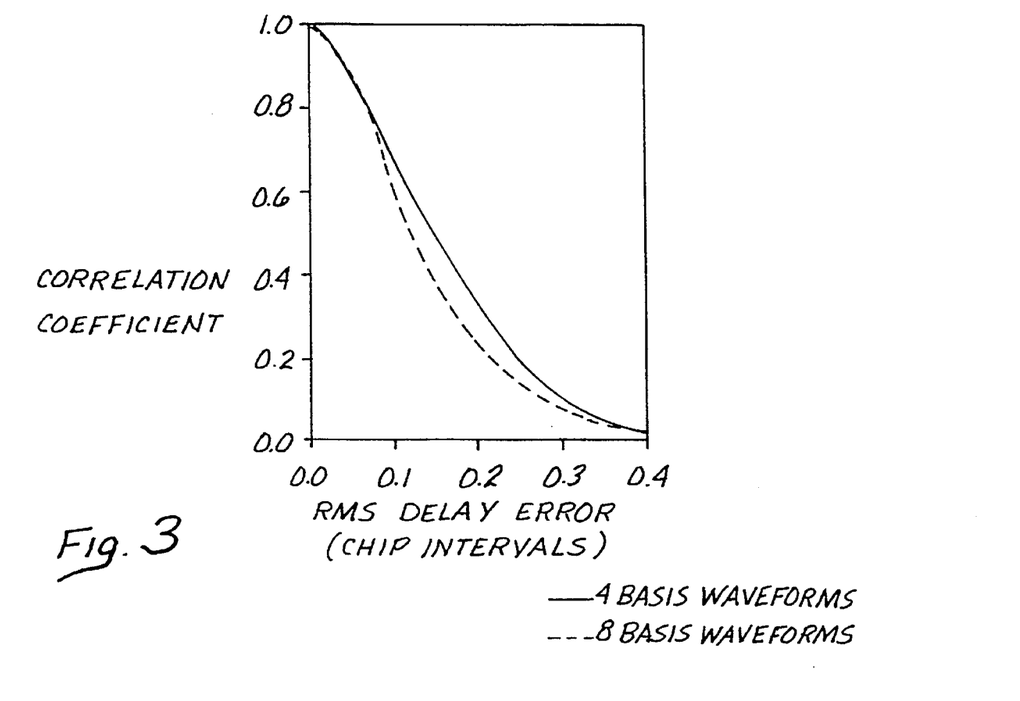
FIG. 3 is a plot of delay error dependence versus correlation coefficient according to the present invention.

To assess the effects of processing errors in delays, FIG. 3 shows the average correlation coefficient computed for the "00" and "000" binary word configurations (corresponding to two and three feedback waveguides, respectively) when the receiving switched delay encoder 22 feedback waveguides are Gaussian distributed about the correct values, as specified in Equation 1, with RMS errors equal to a given fraction of a chip interval. It is noted that the received waveform remains highly correlated with the response of the receiving switched delay encoder 22, up to delay areas of approximately 15%.

The correlation coefficients of the above two Tables I and II, which do not lie along the upper-left-to-lower-right diagonals, can be compared to ratios of cross correlation-to-auto correlation peaks for typical direct sequence waveforms of the prior art. From this comparison, the carrier waveforms of the present invention appear to exhibit much greater discriminability than their direct sequence counterparts. The advantage of the present invention over the prior art in the arena of spread spectrum optical is communications is considerable, since a pseudo noise sequence must posses a chip rate (equal $1/T_c$) on the order of that band with (approximately 100 THz) in order to fully utilize the optical fiber's available bandwidth.

The carrier waveform of the present invention is also inherently immune to fiber dispersion, since filtering is accomplished on the basis of a received signals power spectrum, which is unaffected by the phaseonly filtering of a typical single-mode fiber.

The flow chart of FIG. 4 illustrates the method of the presently preferred embodiment. AT Step 52 a user input specifies which carrier signal of a plurality of carrier signals is to be used to carry the data modulated by the light emitting diode 14 (FIG. 1). At Step 54, the feedback waveguides 20 are enabled and disabled according to the user input, and at Step 56 a wide band optical source 14 is amplitude modulated by the desired data to be transmitted over the fiber channel 26.

The amplitude modulations are input into the transmitting switched delay encoder 12 at Step 58, and the gain 18 and feedback waveguides 20 generate an output at Step 60. At Step 62, output of the transmitting switched delay encoder 12 is placed onto the fiber optic channel 26. The receiving switched delay encoder 22 having the same configuration as the transmitting switched delay encoder 12 as defined by the user input via the keyboard 22, receives the output of the transmitting switched delay encoder (which was placed on the fiber optic channel 26) at Step 64.

The output from the receiving switched delay encoder 22 is fed into the square law detector 32 to generate a voltage or current proportional to be detected average intensity at Step 66. Finally, at Step 68 the amplitude modulations from the detected average intensities are detected. In the presently preferred embodiment, this detection of the amplitude modulations, may result from a transducer and speakers.

Although an exemplary embodiment of the invention has been shown and described, many changes, modifications and substitutions may be made by one having ordinary skill in the art without necessarily departing from the spirit and scope of this invention.

I claim:

1. A method of communicating information between a sender and a receiver, the method comprising the following steps:

emitting light from a wide band optical source at a transmitting station;

inputting the light into a first switched delay encoder at the transmitting station, the switched delay encoder applying a gain to the inputted light to yield an amplified light, the first switched delay encoder also applying at least one delay to the inputted light via a feedback path, the feedback path feeding amplified light back to the inputted light, the first switched delay encoder further outputting a carrier output which comprises the amplified light as modified by the at least one delay;

modulating the carrier output at the transmitting station to encode the information to be communicated;

inputting the carrier output from the first switched delay encoder into a second switched delay encoder located at a receiving station, the second switched delay encoder being substantially similar to the first switched delay encoder and outputting a filtered carrier output;

generating an electrical signal which is proportional to an average intensity of the filtered carrier output, the electrical signal being generated with a square law detector; and detecting the encoded information within the electrical signal.

2. The method of communicating information between a sender and a receiver according to claim 1, wherein the step of detecting the encoded information within the electrical signal comprises a substep of passing the electrical signal through a transducer to thereby generate sound waves which are detectable by a user.

3. The method of communicating information between a sender and a receiver according to claim 1, wherein the step of detecting the encoded information within the electrical signal comprises the substeps of:

determining whether the electrical signal is greater than a predetermined threshold value; and demodulating the electrical signal upon a determination that the electrical signal is greater than the predetermined threshold value, the demodulating of the electrical signal extracting the information to be communicated that was sent by the transmitting station.

4. The method of communicating information between a sender and a receiver according to claim 1, wherein the light source comprises incoherent light from a light emitting diode, and wherein a transfer function of the first switched delay encoder is the same as a transfer function of the second switched delay encoder.

5. The method of communicating information between a sender and a receiver according to claim 4, wherein a transfer function of the first switched delay encoder is defined by the at least one delay.

6. The method of communicating information between a sender and a receiver according to claim 5, wherein a transfer function of the second autoregressive waveguiding structure is defined by at least one delay of the second switched delay encoder.

7. The method of communicating information between a sender and a receiver according to claim 5, wherein the transfer function of the first switched delay encoder of the transmitting station is also defined by setting the gain so that the average intensity of the filtered carrier output is substantially the same as an average intensity of any other selectable carrier signal.

8. The method of communicating information between a sender and a receiver according to claim 6, wherein the gain of the first switched delay encoder is the same as the gain of the second switched delay encoder, and wherein the at least one delay of the first switched delay encoder is the same as the at least one delay of the second switched delay encoder.

9. The method of communicating information between a sender and a receiver according to claim 1, wherein the first switched delay encoder and the second switched delay encoder realize first and second active infinite impulse response (IIR) optical filters, respectively, and wherein the transfer function of the first active infinite impulse response optical filter of the transmitting station is defined by selecting the at least one delay from a plurality of delays.

10. The method of communicating information between a sender and a receiver according to claim 1, wherein the transfer function of the first active infinite impulse response optical filter of the transmitting station is defined by setting the gain to be any of a plurality of predetermined values and by selecting the at least one delay from a plurality of delays.

11. A method of communicating optical information, the method comprising the following steps:

configuring a first switched delay encoder by selecting a gain for the first switched delay encoder and by selecting at least one delay from a plurality of delays of the first switched delay encoder;

inputting light from a wide band optical source into the first switched delay encoder;

outputting a carrier output from the first switched delay encoder;

modulating the carrier output to encode information onto the carrier output;

inputting the modulated carrier output into a second switched delay encoder; and outputting a filtered carrier output from the second switched delay encoder;

generating an electrical signal which is proportional to an average intensity of the filtered carrier output, the electrical signal being generated with a square law detector; and detecting the encoded information within the electrical signal.

12. A method of operating a programmable switched delay encoder as both a carrier signal generator and as an associated matched filter, the method comprising the following steps:

receiving an input signal, the input signal comprising incoherent light from a light source when the programmable switched delay encoder is operating as a carrier signal generator, the input signal comprising received light from a transmission channel when the programmable switched delay encoder is operating as an associated matched filter;

applying a predetermined amplification to the input signal;

feeding an output of the programmable switched delay encoder back to the input using at least one of a plurality of feedback waveguides, each of the plurality of feedback waveguides realizing a unique, predetermined delay;

receiving a user input, the user input specifying which of a plurality of carrier signals is to be generated by the programmable switched delay encoder when the programmable switched delay encoder is operating as a carrier signal generator, the user input specifying which of the plurality of carrier signals is to be passed by the programmable switched delay encoder when the programmable switched delay encoder is operating as an associated matched filter; and rendering each of the plurality of feedback waveguides to be either transmissive or absorbing, the rendering being performed according to the carrier signal selected by the user input, wherein each of the plurality of carrier signals selectable by the user input comprises a combination of the feedback waveguides rendered either transmissive or absorbing.

13. The method of operating a programmable switched delay encoder as both a carrier signal generator and as an associated matched filter according to claim 12, wherein the plurality of feedback waveguides comprises M feedback waveguides.

14. The method of operating a programmable switched delay encoder as both a carrier signal generator and as an associated matched filter according to claim 13, wherein each of the M feedback waveguides is rendered either transmissive or absorbing according to the carrier signal selected by the user input, the M feedback waveguides thus being configurable to represent $2^M$ distinct carrier signals.

15. The method of operating a programmable switched delay encoder as both a carrier signal generator and as an associated matched filter according to claim 14, wherein each of the $2^M$ distinct carrier signals is selectable by the user input to configure the programmable switched delay encoder to a selected carrier signal, the user input configuring the programmable switched delay encoder to generate the selected carrier signal when the programmable switched delay encoder is operating as a carrier signal generator and configuring the programmable switched delay encoder to pass the selected carrier signal when the programmable switched delay encoder is operating as an associated matched filter.

16. The method of operating a programmable switched delay encoder as both a carrier signal generator and as an associated matched filter according to claim 12, wherein the user input also defines a gain from among a plurality of gains.

17. A method of communicating optical information, the method comprising the following steps:

inputting light through a first waveguide comprising a gain and at least one of a plurality of selectable delays, to thereby generate a carrier output;

modulating the carrier output to encode information thereon;

inputting the modulated carrier output into a second waveguide similar to the first waveguide, to thereby generate a filtered carrier output;

detecting an average intensity of the filtered carrier output;

demodulating the filtered carrier output, if the average intensity is greater than the predetermined threshold value.

18. An apparatus for communicating information between a sender and a receiver, the apparatus comprising:

(a) a transmitting station, including:

(1) a wide band optical source for emitting light;

(2) a first switched delay encoder for inputting the light, for applying a gain to the inputted light to yield an amplified light, and for applying at least one delay to the inputted light via a feedback path, the feedback path feeding amplified light back to the inputted light, the first switched delay encoder outputting a carrier output which comprises the amplified light as modified by the at least one delay; and (3) modulating means for modulating the carrier output to define the information to be communicated; and (b) a receiving station, including:

(1) a second switched delay encoder substantially similar to the first switched delay encoder, the second switched delay encoder inputting the carrier output from the first switched delay encoder and outputting a filtered carrier output; and (2) a square law detector for generating an electrical signal which is proportional to an average intensity of the filtered carrier output;

(3) means for detecting the encoded information within the electrical signal.

19. A programmable switched delay encoder for operating as both a carrier signal generator and as an associated matched filter, the programmable switched delay encoder comprising:

an input for receiving an input signal, the input signal comprising incoherent light from a light source when the programmable switched delay encoder is operating as a carrier signal generator, and comprising received light from a transmission channel when the programmable switched delay encoder is operating as an associated matched filter;

a gain element for applying a predetermined amplification to the input signal;

a plurality of feedback waveguides, each of the plurality of feedback waveguides feeding an output of the programmable switched delay encoder back to the input and having a unique, predetermined delay;

input means for receiving a user input, the user input specifying which of a plurality of carrier signals is to be generated by the programmable switched delay encoder when the programmable switched delay encoder is operating as a carrier signal generator, and also which of the plurality of carrier signals is to be passed by the programmable switched delay encoder when the programmable switched delay encoder is operating as an associated matched filter; and means for rendering each of plurality of feedback waveguides to be either transmissive or absorbing, the rendering being performed according to the carrier signal selected by the user input, wherein each of the plurality of carrier signals selectable by the user input comprises a combination of the feedback waveguides rendered either transmissive or absorbing.

20. The programmable switched delay encoder for operating as both a carrier signal generator and as an associated matched filter according to claim 19, wherein the programmable switched delay encoder realizes an active infinite impulse response (IIR) optical filter.

* * * * *